United States Patent [19]

Piber

[11] 4,100,383

[45] Jul. 11, 1978

[54] INDUSTRIAL REVERSING SPEED CONTROL TRIGGER SWITCHES HAVING SNAP-IN MODULES

[75] Inventor: Earl T. Piber, Oconomowoc, Wis.

[73] Assignee: Cutler-Hammer, Inc., Milwaukee, Wis.

[21] Appl. No.: 711,108

[22] Filed: Aug. 2, 1976

[51] Int. Cl.[2] .......................... H01H 9/06; H02P 7/00

[52] U.S. Cl. ................................... 200/157; 200/1 V; 200/295

[58] Field of Search ........................ 200/157, 295, 1 V; 310/48, 50, 68 R, 68 D, 48, 50; 361/381, 386, 387; 318/331, 345, 345 R

[56] References Cited

U.S. PATENT DOCUMENTS

| | | | |
|---|---|---|---|
| Re. 26,781 | 2/1970 | Frenzel | 260/157 |
| 3,260,827 | 7/1966 | Frenzel | 200/157 |
| 3,328,613 | 6/1967 | Gawron | 310/48 |
| 3,456,229 | 7/1969 | Matthews | 338/198 |
| 3,467,801 | 9/1969 | Matthews | 200/157 |
| 3,536,973 | 10/1970 | Matthews et al. | 318/345 |
| 3,543,120 | 11/1970 | Robertson | 318/345 |
| 3,632,936 | 1/1972 | Piber | 200/157 |
| 3,637,967 | 1/1972 | Braun | 200/155 R |
| 3,648,142 | 3/1972 | Corey et al. | 318/345 |
| 3,895,198 | 7/1975 | Piber | 200/295 X |

OTHER PUBLICATIONS

Arrow Hart, Inc.; "Trigger Speed Control Switch with Reversing and Trigger Lock," Photo Nos. 7262-1 to 7262-4, Circuit Diagram.

*Primary Examiner*—James R. Scott
*Attorney, Agent, or Firm*—Hugh R. Rather; William A. Autio; Michael E. Taken

[57] ABSTRACT

Two embodiments of industrial grade trigger switches are disclosed. Each has an on-off switch and a resistor controlled speed control circuit operated by trigger depression and a reversing switch provided with an operating lever overlying the trigger, and characterized by modular construction with snap-in coupling of reversing switch and base to the frame, a large heat sink area for the solid state current control elements for continuous service, higher current rating double-pole contacts having sufficient wiping action to effect good electrical contact, and the capability of being mounted also in consumer grade tools. The first embodiment has a horizontally disposed substrate that supports the speed control circuit thereby providing a large amount of space within the base for the on-off and shunting contacts. The second embodiment has a large vertically disposed substrate affording a large area for the speed control circuit. The two embodiments differ also in their on-off and shunting switch contacts and their manner of operation, in the heat sink and substrate assembly, in the manner of operating the variable resistor by the trigger, in the reversing switch structure and other details.

14 Claims, 34 Drawing Figures

Fig. 1
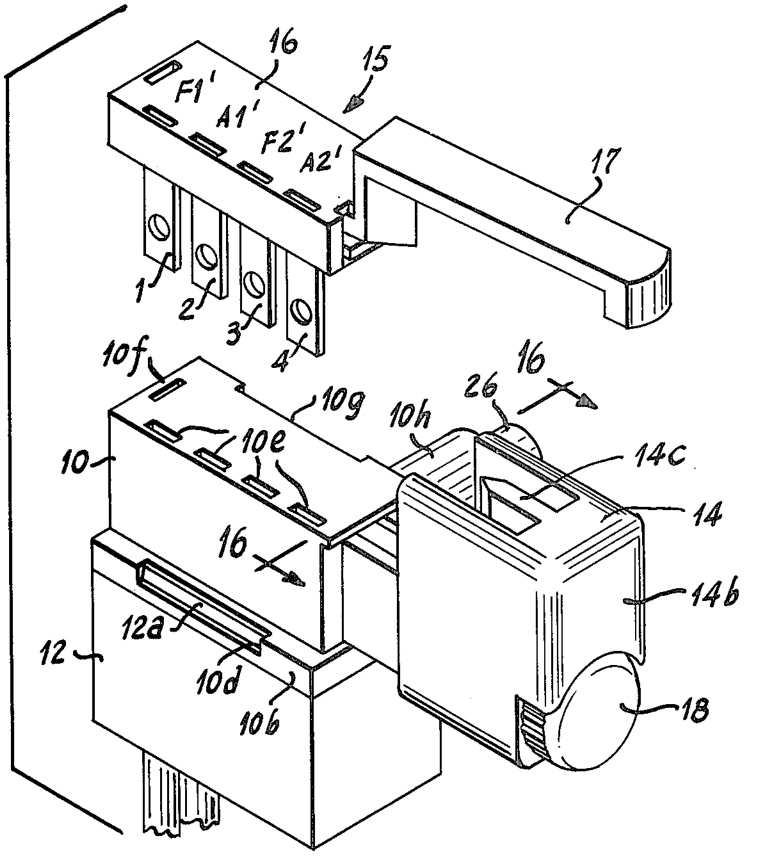
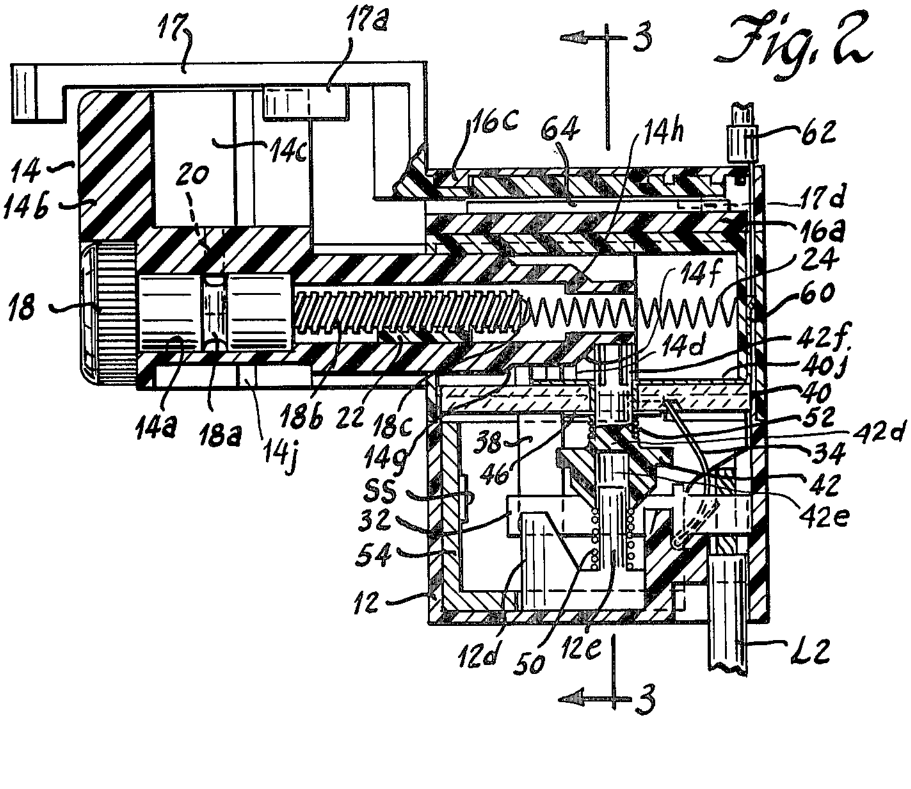
Fig. 2

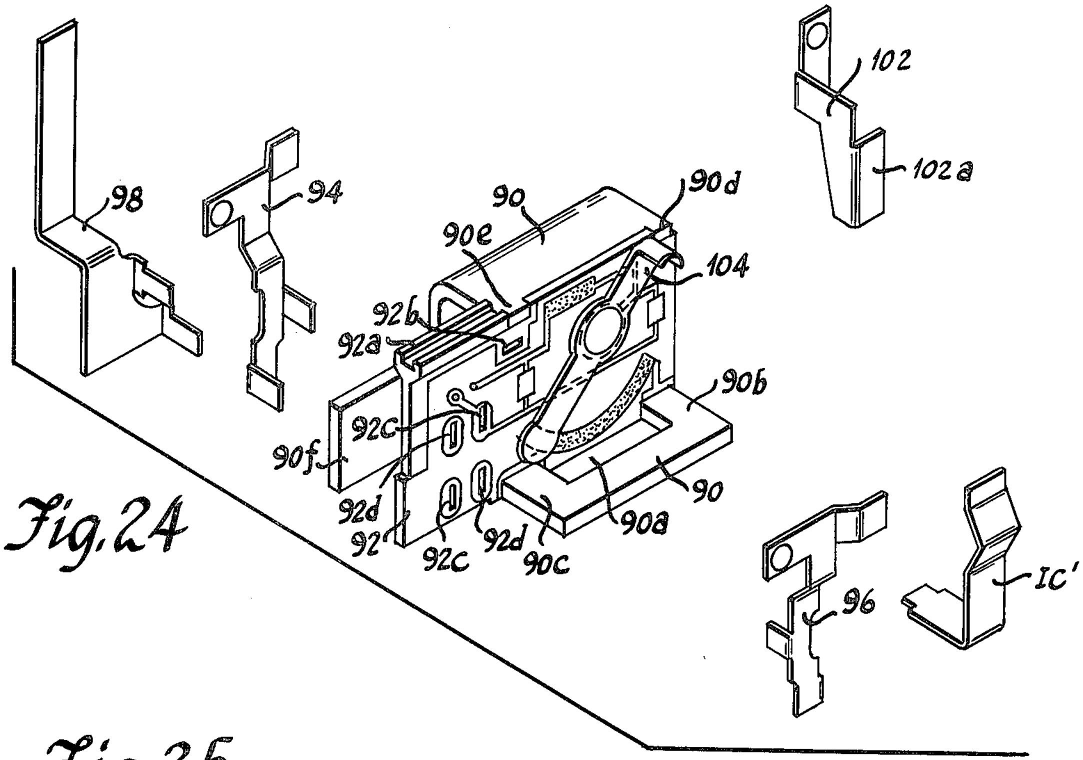
Fig. 24
Fig. 25
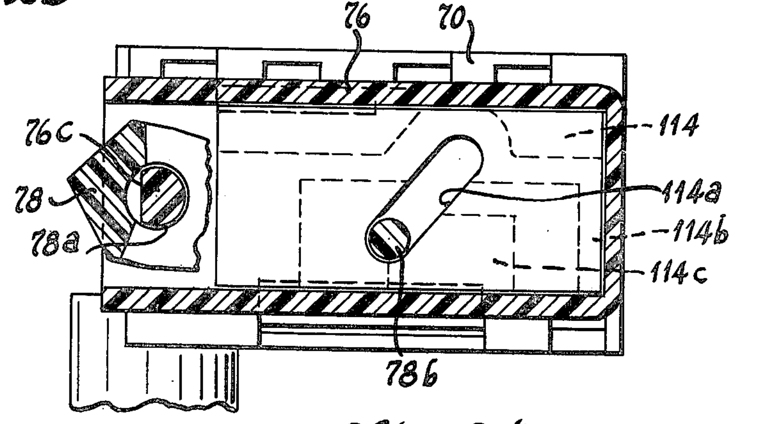
Fig. 26
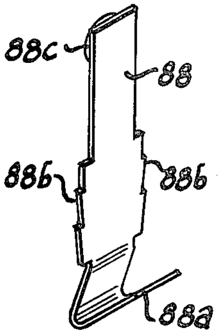
Fig. 34
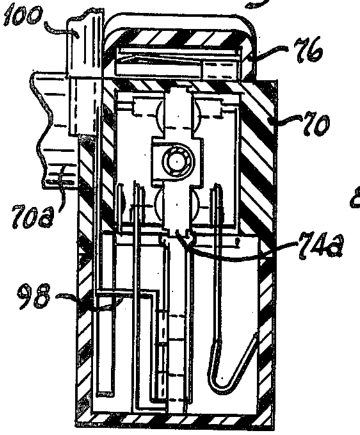
Fig. 27
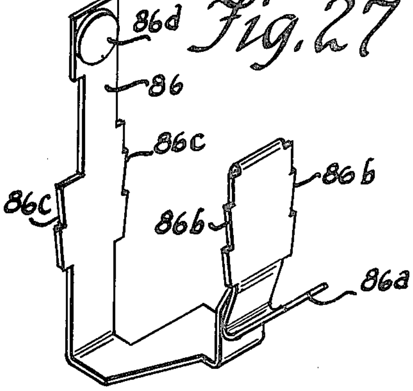

INDUSTRIAL REVERSING SPEED CONTROL TRIGGER SWITCHES HAVING SNAP-IN MODULES

BACKGROUND OF THE INVENTION

Speed control trigger switches with an attached reversing switch have been known heretofore. For example, C. J. Frenzel U.S. Pat. No. 3,260,827, dated July 12, 1966, shows such switch including a reversing operating lever extending forwardly over the trigger. While these prior switches have been useful for their intended purpose, this invention relates to improvements thereover.

SUMMARY OF THE INVENTION

An object of the invention is to provide an improved speed control trigger switch especially devised for industrial applications but affording use also in consumer tools.

A more specific object of the invention is to provide a speed control trigger switch with improved snap-together modular construction.

Another specific object of the invention is to provide a speed control trigger switch with improved reversing switch structures.

Another specific object of the invention is to provide a speed control trigger switch with improved double-pole contacts having sufficient wiping action for good electrical operation.

Another specific object of the invention is to provide an improved speed control trigger switch having a large heat sink for the solid state power control element.

Another specific object of the invention is to provide an improved speed control trigger switch with a reversible trigger to adapt the switch to different applications.

Other objects and advantages of the invention will hereinafter appear.

BRIEF DESCRIPTION OF THE DRAWINGS

FIG. 1 is an enlarged, isometric view of a modular, industrial, reversing speed control trigger switch according to the invention showing the reversing switch separated from the speed control trigger switch;

FIG. 2 is a vertical longitudinal cross-sectional view showing internal parts of the switch of FIG. 1 as assembled and taken substantially along line 2—2 of FIG. 3 with the trigger undepressed;

FIG. 24 is a partially exploded isometric view of the subassembly of FIG. 23 showing the contacts and connectors separated from the substrate;

FIG. 25 is an enlarged horizontal cross-sectional view substantially along line 25—25 of FIG. 20 to show the actuating mechanism of the reversing switch;

FIG. 26 is an isometric view of the right-hand stationary contact including its spring-clip terminal portion that is shown assembled in the base in FIG. 30;

FIG. 27 is an isometric view of the left-hand stationary contact including its spring-clip terminal portion that is shown assembled in the base in FIG. 30;

FIG. 34 is a vertical, lateral cross-sectional view taken along line 34-34 of FIG. 31 to show the on-off switch contacts.

DESCRIPTION OF THE PREFERRED EMBODIMENTS

Figure 3:
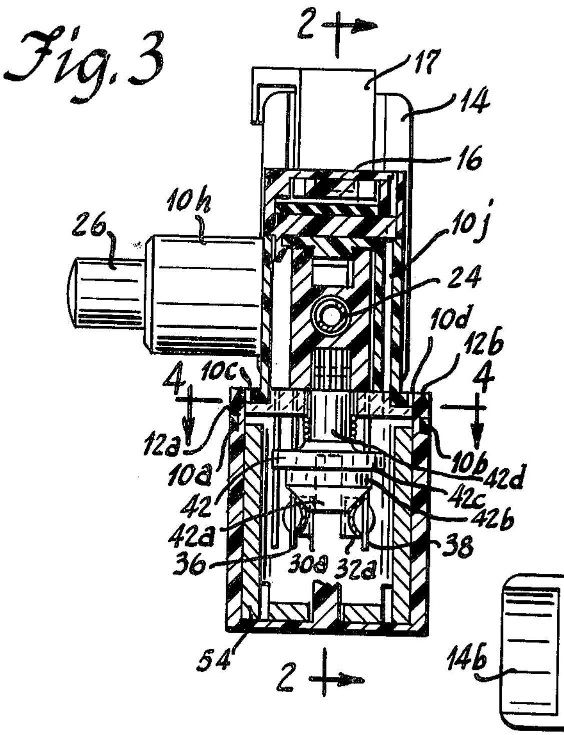
FIG. 3 is a vertical lateral cross-sectional view along line 3—3 of FIG. 2 showing the internal parts of the switch from a different direction.

Referring to FIG. 1, there is shown a modular, industrial, reversing speed control trigger switch constructed in accordance with the invention. This switch is provided with a frame 10, a modular snap-in base 12 attached below the frame, an operating lever in the form of a trigger 14 mounted by the frame for reciprocal sliding movement on top of the base, and a modular snap-in reversing switch 15 attached on top of the frame so that its actuating lever 17 extends forwardly over the trigger.

The frame is narrower than the base and is provided with left and right ledges 10*a* and 10*b* at its lower portion coextensive with the base as shown in FIG. 3. Left and right refer to directions when the trigger is pointing away from the user. Elongated narrow slots 10*c* and 10*d* in these ledges, shown in FIGS. 1 and 3, receive closely fitting hooks 12*a* and 12*b* at the upper left and right edges of the base for snap-in assembly of the base to the bottom of the frame.

The upper part of the frame is provided with four forwardly aligned slots 10*e* adjacent the right edge thereof for receiving respective terminals of the reversing switch contacts 1, 2, 3 and 4 hereinafter described. A transverse slot 10*f* at the rear upper edge of the frame provides access for the tongue of a wire terminal for connecting one side of the motor field winding to the speed control circuit as shown in FIG. 2 and hereinafter described in connection with the schematic diagram in FIG. 15.

In a similar manner, the upper right edge of the reversing switch housing is provided with aligned slots A1', F2' and A2' directly above the terminals of contacts 2, 3 and 4, respectively, for plugging in armature A1 and A2 and one field terminal F2. And in a similar manner, a transverse slot F1' is provided at the rear upper edge of the reversing switch housing for plugging in the other field terminal F1. The left lower edge of the reversing switch housing is provided with a relatively wide hook (not shown) that snaps into slot 10*g* on the left upper corner of the frame to secure them together.

Figure 8:
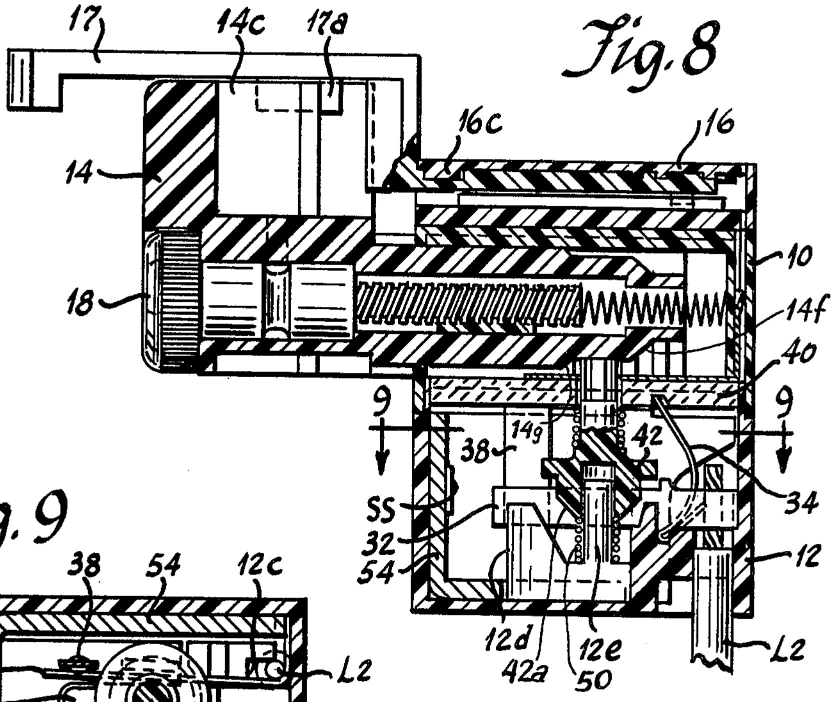
FIG. 8 is a view like FIG. 2 with the trigger partially depressed to close the two poles of the on-off contacts.

As shown in FIG. 2, trigger 14 is provided with a bore 14*a* retaining a stop adjusting screw 18 having its head partially recessed into the lower part of the forward finger-engaging portion 14*b*. The shank of this screw is provided with an annular groove 18*a* whereby the screw is longitudinally locked in the trigger by a pin 20 driven through a hole in the trigger into this groove while allowing rotation of the screw. The rear half of the shank of this screw is provided with a reduced diameter threaded section 18*b* for driving a stop block 22 at half-threads 22*a*, shown in FIG. 19, that is slidably guided within the trigger for limited adjustment to set the speed of the tool motor. The extreme rear end of this screw is provided with a semi-spherical boss 18*c* for retaining the forward end of a helical compression spring 24 whose rear end bears against an inner wall of the frame to act as the trigger return spring. The upper portion of the trigger is provided with a pair of rearwardly opening slots separated by a divider 14*c* providing an interlock for actuating lever 17 of the reversing switch via lug 17*a* thereon to prevent actuation of the reversing switch when the trigger is depressed as shown in FIGS. 2, 8 and 10.

Figure 16:
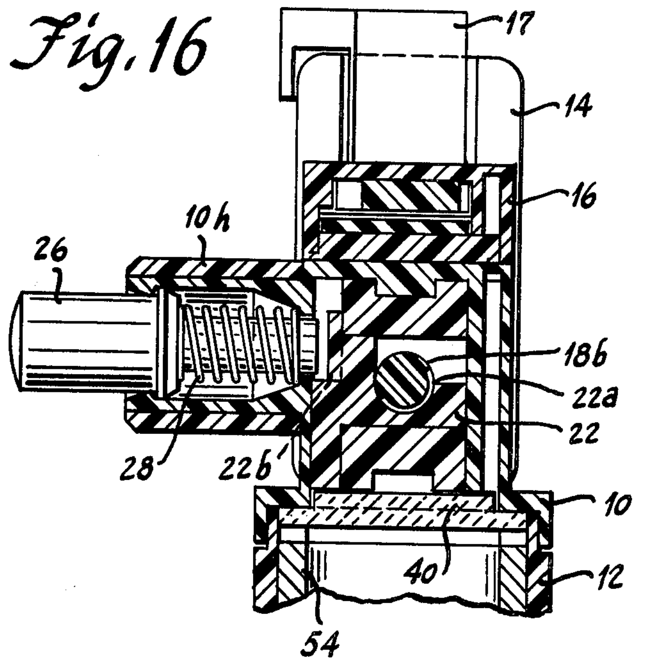
FIG. 16 is an enlarged vertical lateral cross-sectional view along line 16—16 of FIG. 1 showing the stop button and adjustable stop block structures.
Figure 19:
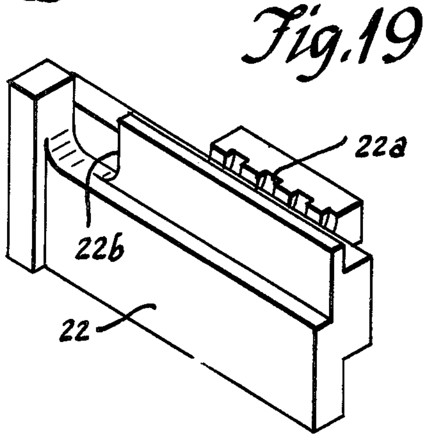
FIG. 19 is an isometric view of the stop block slidably mounted in the trigger of the switch of FIG. 16.

The frame is provided with a bushing 10*h* extending out from the forward portion of its left side as shown in FIGS. 1 and 3 for retaining a stop button 26 that is biased leftward by a helical compression spring 28 as shown in FIG. 16 and may be depressed to engage notch 22*b* in the stop block 22 to lock the trigger in a selected position, this notch being shown more clearly in FIG. 19.

Figure 9:
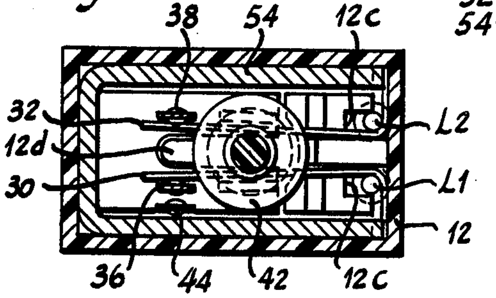
FIG. 9 is a horizontal cross-sectional view along line 9—9 of FIG. 8 showing a top view of the closed two poles of the on-off contacts.

The on-off switch contacts are mounted within base 12. For this purpose, there are provided suitable integrally molded retainers including slots and stops within the base for mounting left and right movable contacts 30 and 32 as shown in FIGS. 2, 3, 8 and 9. Each such movable contact is substantially L-shaped with the foot portion of contact 30 extending to the left as shown in FIG. 9 and the foot portion of contact 32 extending to the right to provide bends against which the stripped and soldered end portions of insulated power conductors L1 and L2 are clamped by respective connector clips such as clip 34 shown in FIG. 2. A pair of holes 12*c* are provided through the bottom of the base at the rear portion thereof through which the power conductors are inserted as shown in FIG. 9. The rear end portions of movable contacts 30 and 32 are held in slots in the base and are connected to the power conductors. These movable contacts are held in the base on edge as shown in FIGS. 2 and 9 and their forward end portions are free to be deflected outwardly into engagement with stationary contacts 36 and 38, respectively, that are suspended from substrate 40 as shown in FIGS. 2, 3, and 9. A stop 12*d* integrally molded within the base and extending from the bottom thereof upwardly between the forward ends of movable contacts 30 and 32 separates the latter from one another sufficiently to afford entry of actuator 42 therebetween as hereinafter described. These movable contacts are flexed apart to close with the stationary contacts when the trigger is depressed as shown in FIGS. 9 and 11 and are returned to open condition by their self-bias when the trigger is released.

Figure 10:
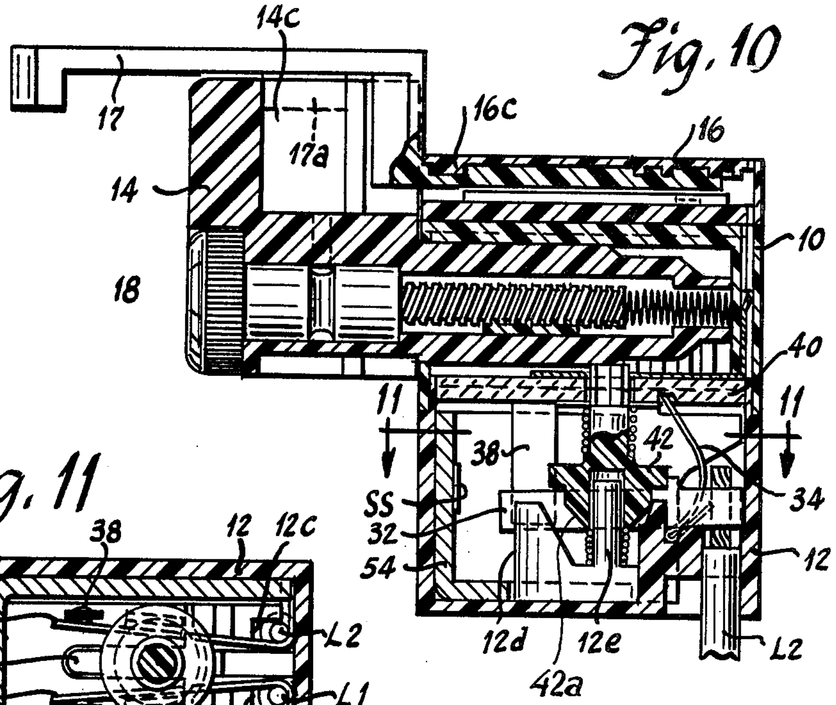
FIG. 10 is a view like FIG. 8 with the trigger fully depressed to close the shunting contact in addition to the two poles of the on-off contacts.
Figure 11:
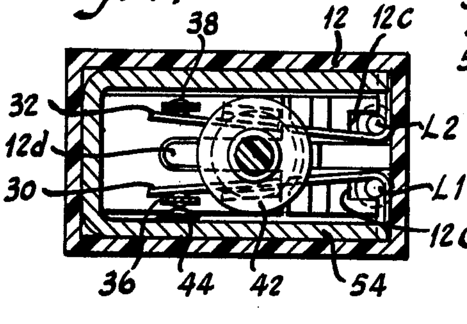
FIG. 11 is a horizontal cross-sectional view taken along line 11—11 of FIG. 10 showing a top view of the closed shunting contact and two poles of the on-off contacts.

Shunting contact 44 is also suspended from substrate 40 in spaced parallel relation to stationary contact 36 so as to be engaged by stationary contact 36 upon further depression of the trigger as shown in FIGS. 10 and 11 for full speed operation of the tool.

On-off and shunting switch actuator 42 is a rotary-reciprocating member. It is rotated by the trigger to actuate wiper 46, FIGS. 2 and 17, of the speed adjusting resistor 48, FIG. 7, and is reciprocated down and up to close and reopen the on-off and shunting switch contacts. As shown in FIG. 3, the lower end of this actuator 42 is provided with a frusto-conical portion 42*a* for camming the movable contacts against the stationary contacts. Immediately above this frusto-conical portion is a cylindrical portion 42*b* that limits the outward deflection of the movable contacts and above that an annular flange 42*c* for engaging the top edge of the movable contacts to provide a small amount of sliding or wiping between the movable and stationary contacts, enough to keep them clean and in good electrical contact. Above this flange is a small annular spring-abutment shoulder from which a round shaft 42*d* extends up through a hole in substrate 40. This actuator is mounted by a coaxial bore 42*e* extending partway up from its lower end into which extends a round post 12*e* shown in FIG. 2 onto which the actuator is journaled while allowing the actuator to slide up and down on this post. A helical compression spring 50 surrounds post 12*e* to bias actuator 42 upwardly against the bottom, cammed surface of the trigger hereinafter described.

Shaft 42*d* of the actuator is arranged to actuate the variable speed control resistor. For this purpose, a helical compression spring 52 surrounds this shaft above the aforementioned small shoulder and presses wiper 46, shown in FIGS. 2 and 17, against the lower surface of the substrate and circular resistor 48 printed thereon.

The actuator is operated by its upper end portion that extends above the substrate. For this purpose, this upper end portion is provided with gear teeth 42*f* therearound. One of the spaces between a pair of these teeth is cut longer down the shaft so that it extends below the lower surface of the substrate when the actuator is in its uppermost position as shown in FIG. 2 to provide a keyway. Wiper 46 shown in FIG. 17 is provided with a key 46*a* that fits into the keyway to mount the wiper non-rotatably on this shaft while allowing it to move up and down thereon when the trigger is actuated.

Figure 17:
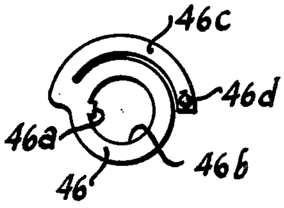
FIG. 17 is a top plan view of the wiper for the variable resistor of FIGS. 2 and 7.

As shown in FIG. 17, wiper 46 has an annular portion with a central hole 46*b* into which key 46*a* projects. An arcuate portion 46*c* extends partway around such annular portion in closely spaced relation thereto, is integrally connected at one end to such annular portion on a common plane and has a contacting boss 46*d* at its free end. This arcuate portion extends at a small angle upwardly from the plane of the annular portion to provide adequate contact force against the resistor when spring 52 presses the annular portion against the printed circuit on the lower surface of the substrate.

Figure 5:
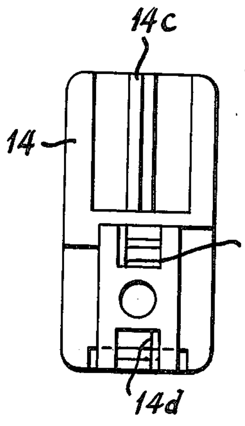
FIG. 5 is a rear view of the trigger showing the reversing lever interlocking slots and the return spring hole therein.
Figure 6:
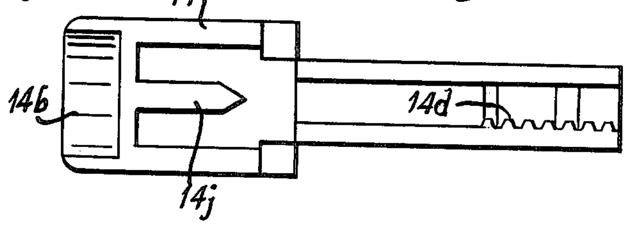
FIG. 6 is a bottom view of the trigger showing the reversing lever interlocking slots and one of the alternative driving racks for the variable resistor wiper.

Gear teeth 42*f* on the upper end portion of shaft 42*d* mesh with one of two racks on the trigger to afford rotation of the actuator when the trigger is depressed. This rack 14*d* is shown in FIGS. 2 and 5 and is used when the trigger is mounted as shown in the drawings with its finger-engaging portion extending up. If it is desired to rotate the trigger 180° so that its finger-engaging portion extends down and thus to use it without the reversing switch, there is provided a second rack 14*e* shown in FIGS. 5 and 6 which would then mesh with the teeth on the actuator shaft. This rotated position is an alternative orientation of the trigger which may be provided in assembly to fit tools of certain manufacturers. This rack rotates the actuator counter-clockwise when viewed from the bottom and carries wiper 46 with it thereby to reduce the amount of resistance 48 in circuit as indicated by the arrows in FIGS. 7 and 15.

As the trigger is depressed, actuator 42 is not only rotated but also is pushed downward in two steps by the lower cammed surface of the trigger having three horizontal lands connected by two inclines 14*f* and 14*g* therebetween as shown in FIG. 2. The trigger has a like upper cammed surface 14*h* for use if the trigger is turned 180° before assembly as hereinbefore described and a like interlocking divider 14*j* to prevent reversal when the trigger is depressed.

The normally-open position of the contacts is shown in FIG. 2. In this position, the trigger is released and extended forwardly and the upper end of the shaft 42*d* of actuator 42 is biased up against the first land at the rear end of the trigger.

As the trigger is depressed to the position shown in FIG. 8, the on-off switch contacts close. For this purpose, incline 14*f* slides actuator 42 down on post 12*e* against the force of bias spring 50. During this motion of the actuator, frustoconical surface 42*a* thereof acts on the intermediate curved surfaces 30*a* and 32*a*, shown in FIG. 3, of the movable contacts to spread their free, forward ends apart to engage the lower ends of stationary contacts 36 and 38, respectively, as shown in FIG. 9, to close the double-pole contacts of the on-off switch.

Figure 15:
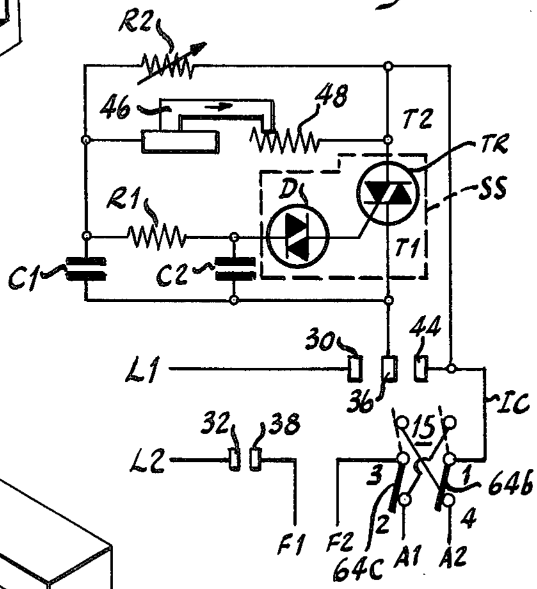
FIG. 15 is a schematic diagram of the speed control circuit of FIG. 7 and the on-off and reversing switches connected thereto.

This closure of the on-off switch on initial depression of the trigger causes A.C. power to be applied across triac TR of the speed control circuit and the motor armature and field windings in series, in FIG. 15, the armature being connected across terminals A1 and A2 and the field being connected across terminals F1 and F2. At the same time, the A.C. voltage of this power supply across power lines L1 and L2 is applied across the triac firing control circuit. Whenever line L1 is positive, current flows through contacts 30 and 36, capacitor C1 and through capacitor C2 and resistor R1 in parallel therewith, and then through wiper 46 and resistor 48, reversing switch 16, terminal A2, the armature, terminal A1, terminal F2, the field, terminal F1, and contacts 38 and 32 to line L2. Variable resistor R2 in parallel with speed control resistor 48 is a trimming resistor which may be adjusted for proper operation of the circuit. This current flow charges capacitors C1 and C2 until the voltage thereon reaches the triggering value of diac D whereupon this diac passes a pulse of current into the gate of the triac to fire it into conduction. Current then flows through this triac for the remainder of the positive half-cycle to energize the motor.

On each negative half-cycle, current flows in the opposite direction in the afore-traced paths to fire the triac into conduction.

As the trigger is depressed further, resistance 48 is reduced to increase the motor speed. On this further depression of the trigger, rack 14*d* of the trigger engages teeth 42*f* to rotate actuator 42 and wiper 46 to decrease resistance 48 in circuit. This allows capacitors C1 and C2 to charge to the diac triggering value sooner on each half-cycle thereby to advance the firing angle of the triac to increase the motor speed in a stepless fashion. During this depression of the trigger, the land between cam inclines 14*f* and 14*g* slides on the upper end of the actuator as shown in FIG. 8.

At the end of the trigger depression motion, shunting contacts 44–36 are closed to shunt the speed control circuit and apply full power to the motor. This is done by incline 14*g* of the trigger cam pressing actuator 42 still further down as shown in FIG. 10, causing frustoconical surface 42*a* of the actuator to spread the movable contacts still further. As a result, movable contact 30 presses stationary contact 36 into engagement with shunting contact 44 as shown in FIG. 11. Referring to FIG. 15, it will be seen that contacts 30, 36 and 44 in series engagement now by-pass the triac speed control circuit to connect the motor in series with the reversing switch across the line for full speed operation of the motor.

Upon release of the trigger, spring 24 returns it to its extended, off position. Initially actuator 42 moves up along incline 14*g* to open the shunting contacts. Then the trigger rotates the actuator and wiper 46 to increase the resistance and thus reduce the power applied to the motor. Finally, the actuator moves up incline 14*f* in response to the force of spring 50 to reopen the double-pole on-off contacts and disconnect power from the motor.

Figure 7:
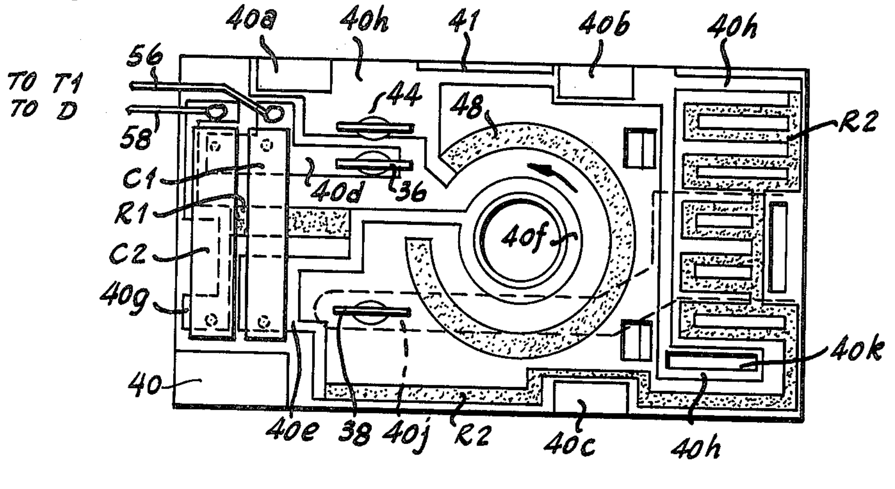
FIG. 7 is an enlarged bottom view of the substrate of FIG. 4 showing the PC (printed circuit) speed control circuit carried thereby.

The speed control circuit of FIG. 15 is mounted within base 12, the triac and diac solid state element SS thereof being mounted on heat sink 54 as shown in FIG. 1 and the capacitors, resistors and their interconnections being mounted as a printed circuit on substrate 40 as shown in FIG. 7.

Figure 18:
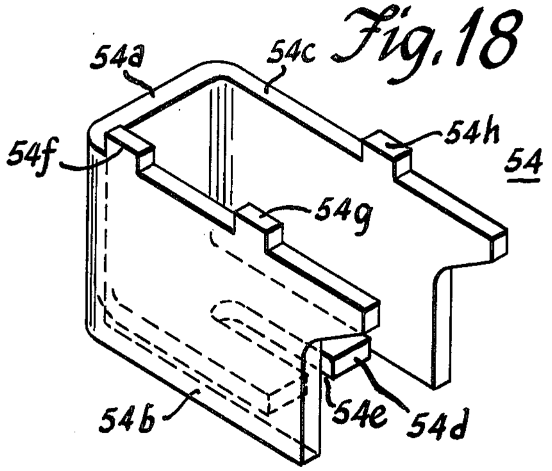
FIG. 18 is an isometric view of the heat sink of FIGS. 2 and 3 onto which the solid state device of FIG. 15 is mounted.

This heat sink 54 is shown more clearly in FIG. 18. It is formed from a copper plate to have a forward vertical wall 54*a* from which left and right side walls 54*b* and 54*c* are bent back at 90°. A bottom tab 54*d* is also bent back 90° from the forward vertical wall. This bottom tab has an elongated slot 54*e* therein to provide clearance for stop 12*d* extending up from the bottom of the base. A pair of spaced lugs 54*f* and 54*g* on the upper edge of the left wall and a lug 54*h* on the upper edge of the right wall fit into complementary notches 40*a*–*c* in the lower surface of substrate 40, shown in FIG. 7, to support the insulating substrate at the top of the base.

Figure 4:
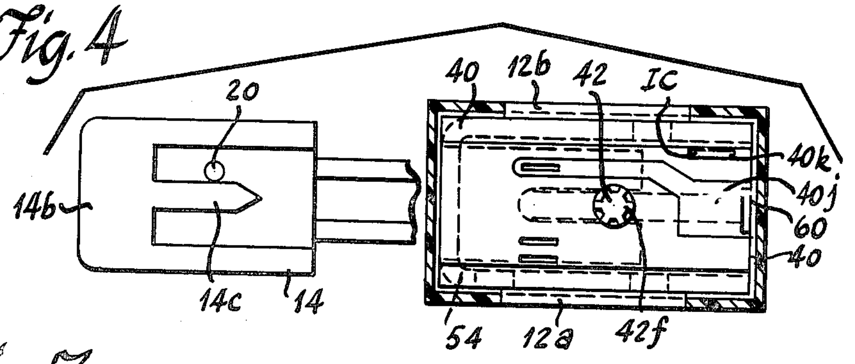
FIG. 4 is a horizontal cross-sectional view of the base along line 4—4 of FIG. 3 showing the upper surface of the substrate that carries a printed circuit on its lower surface and a top view of the trigger.

This substrate 40 in FIG. 7 is provided with a printed circuit including a conductor 40*d* connecting stationary contact 36 to one side of capacitors C1 and C2. A wire 56 connects this conductor 40*d* to terminal T1 of the triac. The other side of capacitor C1 is connected through a conductor 40*e* to collector 40*f* that is contacted by wiper 46 and to one side of resistor R1. The other side of capacitor C2 is connected through a conductor 40*g* to the other side of resistor R1 and to diac D through a wire 58. Printed circuit (PC) conductor 40*e* is also connected to one side of trimming resistor R2. As shown in FIG. 7, this trimming resistor is provided with closed loops so that one or more thereof may be cut to adjust the value of the resistance to the desired value. The other side of this trimming resistor is connected through a PC conductor 40*h* to the heat sink and therethrough to terminal T2 of the triac mounted thereon, to one end of variable resistor 48 and to shunting contact 44. It will be apparent that wiper 46 bridges collector 40*f* to resistor 48 and rotation of this wiper adjusts the amount of resistance in the circuit. Stationary contact 38 is connected through PC conductor 40*j* (FIG. 4) on the upper surface of the substrate to an upstanding metal connector 60 shown in FIGS. 2 and 12. The bent lower end 60*a* of this connector may be soldered to PC connector 40*j* so that it extends up therefrom along the rear wall of the frame for engagement by a field wire tongue connector 62 pressed in through slot F1′ of the reversing switch and slot 10*f* of the frame as shown in FIGS. 1 and 2.

Figure 12:
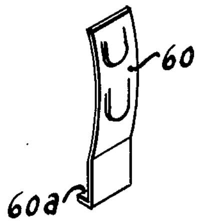
FIG. 12 is an isometric view of one of the two similar internal connectors extending upwardly from the substrate.

Another internal connector IC like that shown in FIG. 12 connects connector 40*h* of the substrate to the reversing switch. For this purpose, this connector IC (FIG. 4) is inserted up through aperture 40*k* (FIG. 7) in the substrate and its bent lower end is soldered to PC conductor 40*h* surrounding this aperture. This connector IC extends up through the rearmost one of four vertical holes 10*j* in the right wall of the frame, one of which is shown in FIG. 3, and is engaged by the terminal of contact 1 of the reversing switch that is inserted in that hole as shown in FIGS. 1 and 15. As will be apparent in FIG. 15, this internal connector IC connects the reversing switch to the speed control circuit.

Figure 13:
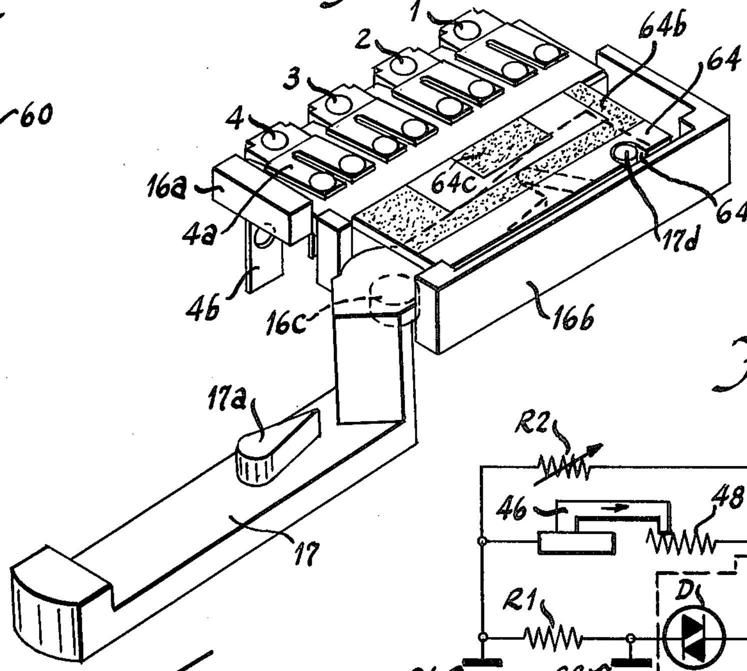
FIG. 13 is an enlarged isometric, unfolded enclosure view of the reversing switch of FIG. 1.
Figure 14:
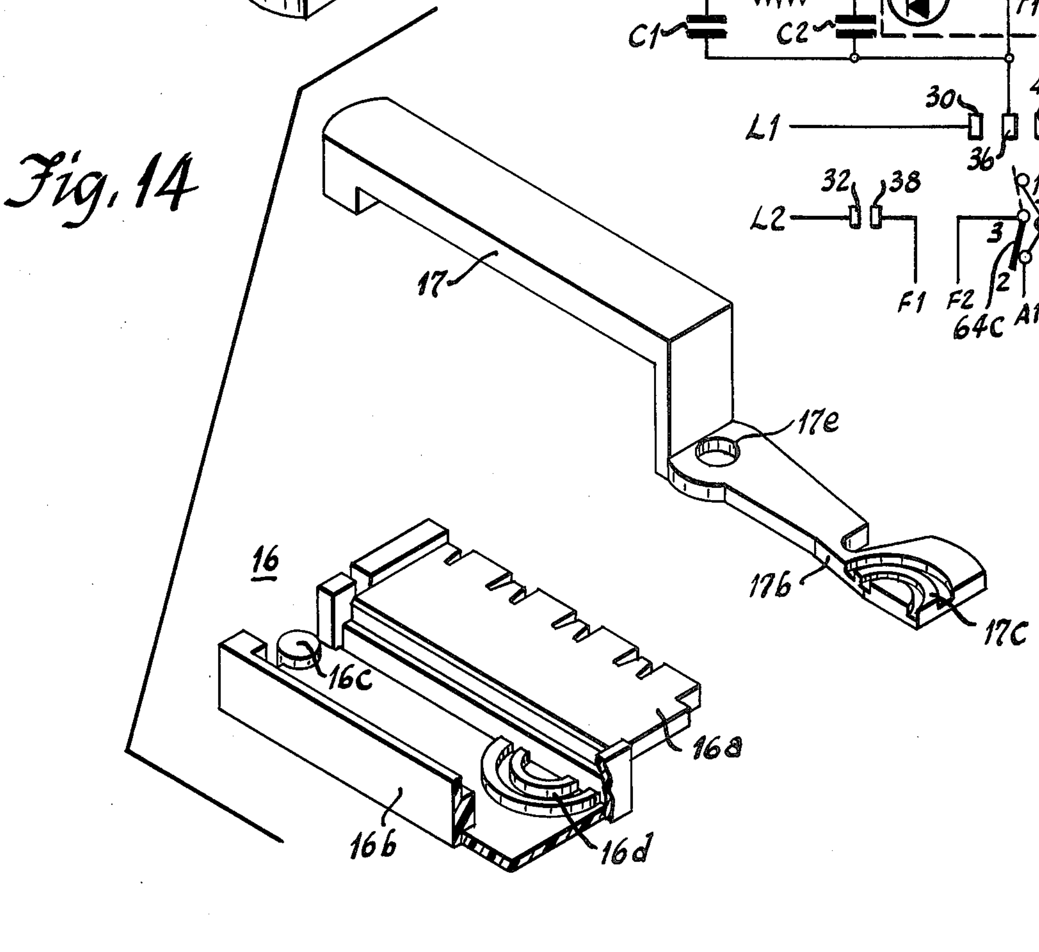
FIG. 14 is an isometric view of the unfolded housing and separated operating lever of the reversing switch of FIG. 13.

This reversing switch 15 is best shown in FIGS. 1, 13 and 14. As shown in FIG. 14, this reversing switch 15 is provided with a fold-over housing or enclosure 16 having a lower half 16*a* and an upper half 16*b* integrally molded therewith and hinged thereto so that after operating lever 17, the four stationary contacts 1–4, and movable bridging contacts printed circuit board 64 have been assembled therein as shown in FIG. 13, upper half 16*b* may be folded over lower portion 16*a* and secured thereto as by sonic welding or solvent bonding the edges opposite from the hinge as shown in FIGS. 1 and 16.

The reversing switch stationary contacts 1–4 are shown in FIG. 13. These four contacts are alike and each is an L-shaped member inverted so that its foot portion 4*a* rests on the lower half of the base and its leg portion 4*b* hangs over the side. The upper half of the base has a lip which embraces these contacts when the upper half is folded over the lower half to retain them in place. The abutting portions of these base halves between the stationary contacts immediately adjacent the bends therein are secured together by sonic welding or the like.

The reversing switch lever is provided with rotary to linear motion translating means. For this purpose, lever 17 is provided with a pivot comprising a round recess 17*e* shown in FIG. 14 whereby this lever is pivotally mounted on the stud 16*c* integrally molded within upper half 16*b*. Spaced from this pivot, the lever has a thin section serving as a hinge 17*b*. The enlarged end portion beyond this hinge is provided with a pair of concentric arcuate grooves 17*c* fitting over complementary arcuate ridges 16*d* within the upper half of the base. These grooves on the lever are designed to slide on the ridges of the base to provide reciprocal arcuate motion to a stud 17*d*, shown in FIG. 13, on the other side of this enlarged end portion of the lever as the lever bends at its hinge 17*b*. This stud 17*d* extends into a slot 64*a* in the right edge of PC board 64 so that its arcuate motion imparts linear motion to this PC board and movable bridging contacts 64*b* and 64*c* mounted thereon.

Forwardly extending operating lever 17 is shown in FIG. 13 as being in its right-hand position wherein movable contact PC board 64 is pushed into its forward position. In this position, movable contact 64*b* bridges stationary contacts 1 and 4 whereas movable contact 64*c* bridges stationary contacts 2 and 3 as shown in FIG. 15. This causes current to flow in the armature in the direction from terminal A1 to A2 at the same time as current in the field flows in the direction from terminal F1 to F2.

Now when operating lever 17 is pushed to its left-hand position, PC board 64 is moved to its rear position. In this position, movable contact 64*c* bridges stationary contacts 1 and 2 while movable contact 64*b* bridges stationary contacts 3 and 4 as shown in dotted lines in FIG. 15. This causes current to flow in the opposite direction in the armature at the same time as the current flows in the same direction in the field winding to reverse the direction of motor operation.

The armature winding of the motor is connected to the switch by pressing its wire connectors into slots A1′ and A2′ shown in FIG. 1 so as to make contact with the terminals of reversing switch stationary contacts 2 and 4, as also shown schematically in FIG. 15. The field winding of the motor is connected to the switch by inserting its wire connectors into slots F1′ and F2′ shown in FIG. 1 so as to make contact with connector 60 and the terminal of contact 3 of the reversing switch as shown in FIGS. 2 and 15. And an A.C. power supply is connected to power lines L1 and L2.

A modified version of the modular, industrial, reversing speed control trigger switch is shown in FIGS. 20–34. While this version is in some respects similar to the first version hereinbefore described, it is different in other respects, primarily in the on-off switch and shunting switch contacts and their manner of operation by the trigger, in the heat sink and substrate subassembly and the manner of operating the variable resistor by the trigger, in the structure of the reversing switch, and in other details.

This switch is provided with a frame 70, a modular snap-in-base 72 attached below the frame as in the first version, an operating lever in the form of a trigger 74 mounted by the frame for reciprocal linear sliding movement on top of the base, and a modular snap-in reversing switch 76 attached on top of the frame so that its actuating lever 78 extends forwardly over the trigger.

The base is attached to the frame by a pair of hooks snapping into slots in its lateral ledges as in the first version.

Figure 21:
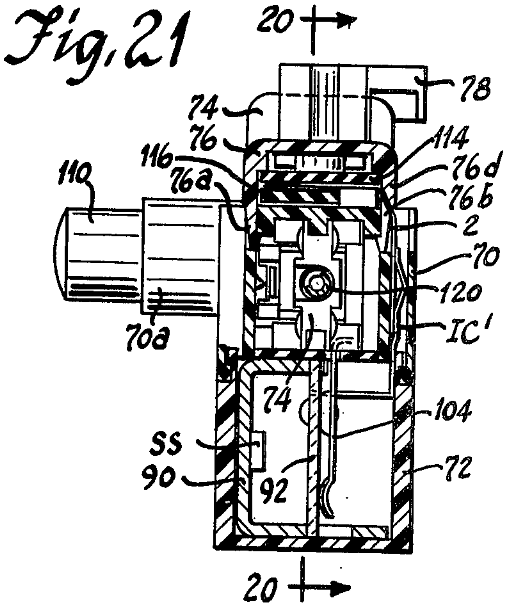
FIG. 21 is a vertical lateral cross-sectional view along line 21—21 of FIG. 20 to show the internal parts of this modified switch from a different direction.

The upper part of the frame is provided with a plurality of slots. There are a pair of long narrow slots, one on the left side and the other on the right side of the upper surface thereof for retaining a respective pair of snap-in hooks 76*a* and 76*b* shown in FIG. 21 suspended from the reversing switch housing for snap-in coupling thereof. There are also four forwardly-aligned slots 81–84 shown in FIG. 31 extending down through the right vertical wall of the frame into which the suspended terminal portions of the corresponding reversing switch contacts extend. Three of these slots are adapted to receive respective wire terminals pressed down from the top and slot 82 accommodates an internal connector IC′ pushed up from below when the base and frame are coupled as shown in FIG. 21. The purpose of this internal connector is to connect the triac to the reversing switch as shown in FIG. 29.

Figure 22:
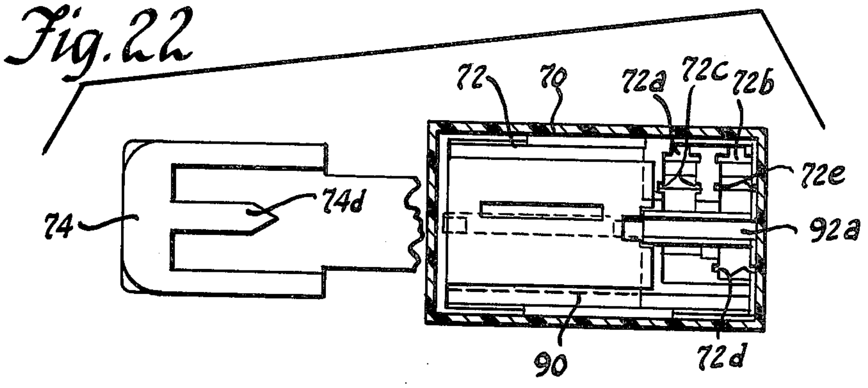
FIG. 22 is a top plan view of the external portion of the trigger and switch base with the on-off switch contacts removed to show the interior configuration of the base.

The internal configuration of the base whereby the two power line connectors of stationary contacts 86 and 88 are supported therein is shown in FIG. 22 looking down into the base compartment. Two holes 72*a* and 72*b* are provided in the bottom of the base through which the stripped and soldered ends of stranded power lines L1 and L2 are inserted to connect with terminals 86*a* and 88*a* of stationary contacts 86 and 88 shown in FIGS. 27 and 26, respectively. As shown in FIG. 22, the base is provided with upstanding walls having pairs of vertical grooves for supporting these stationary contacts. A first pair of opposed grooves 72*c* supports serrated edges 86*b* while a second pair of opposed grooves 72*d* supports serrated edges 86*c* of stationary contact 86. A third pair of opposed grooves 72*e* support serrated edges 88*b* of stationary contact 88. It will be seen that the serrated edge portions of these stationary contacts may be pressed down into these opposed grooves to bite the walls thereof and to securely retain these contacts within the base. Press-in clip portions 86*a* and 88*a* of these stationary contacts are above the respective holes in the bottom of the base so that power conductors inserted thereinto will be gripped between the ends of these clips and the adjacent wall of the base for a good electrical connection in substantially the same manner as in the first version shown in FIG. 2. Upper end portions 86*d* and 88*c* of these two stationary contacts extend up into juxtaposition with a pair of movable contacts and a shunting contact as hereinafter described in connection with FIG. 30.

Figure 23:
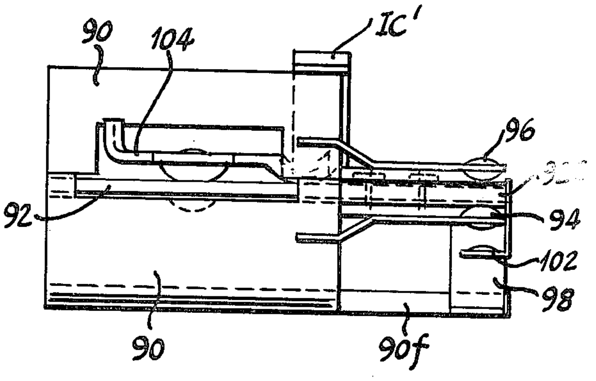
FIG. 23 is a top view of the subassembly including the heat sink, substrate and on-off contacts also shown in FIG. 24.
Figure 29:
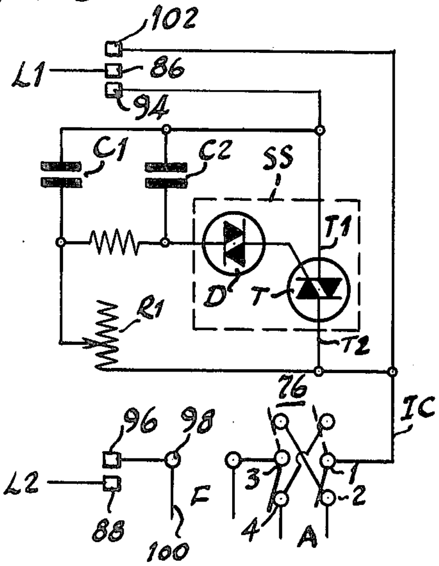
FIG. 29 is a schematic diagram of the speed control circuit of FIG. 28 and the on-off and reversing switches connected thereto.
Figure 30:
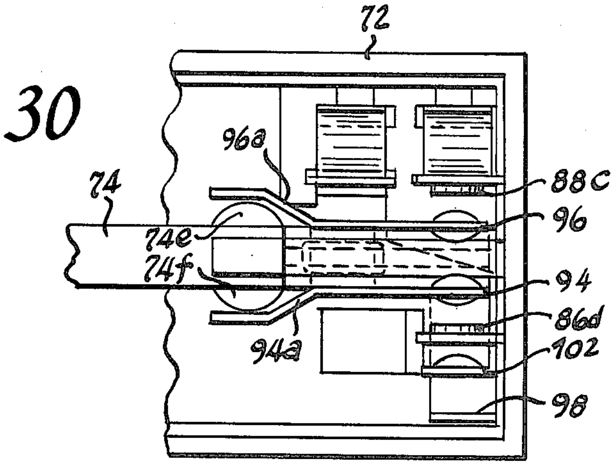
FIG. 30 is an enlarged horizontal cross-sectional view of the rear half of the switch base taken substantially along line 30—30 of FIG. 21 to show the on-off switch contacts.

This base houses a subassembly that includes a heat sink 90 (FIG. 24) supporting solid state element SS, FIG. 21, a substrate 92 supporting the speed control circuit, movable contacts 94 and 96 shown in FIGS. 23, 24 and 30 for engaging stationary contacts 86 and 88, respectively, of the double-pole on-off switch as shown in FIGS. 29 and 30, a connector 98, FIG. 24, that connects movable contact 96 to a motor field wire connector 100 as shown in FIGS. 29 and 34, a shunting contact 102 electrically connected to the printed circuit as hereinafter described, and the aforementioned internal connector IC′.

Figure 28:
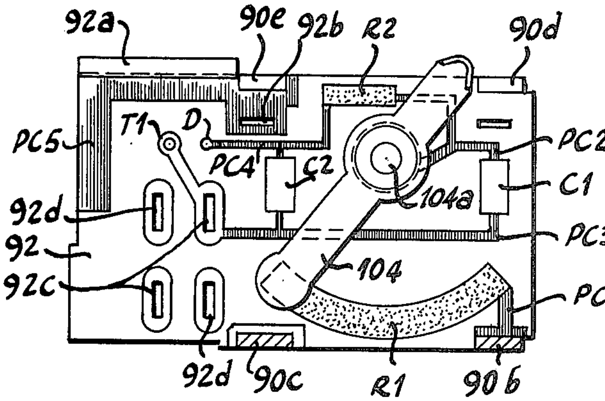
FIG. 28 is a right side elevational view of the substrate including the speed control circuit mounted thereon.

As shown in FIG. 21, heat sink 90 is a generally elongated U-shaped member of good heat conducting metal such as copper with its yoke portion hugging the left wall of the base. Solid state element SS is mounted on the inner surface of this yoke portion so that terminal T2 of the triac thereof is in electrical contact with the heat sink. The lower, flat arm of this U-shaped member extends to the right along the bottom of the base, as shown in FIG. 21, all the way to the right wall of the base. This lower, flat arm is provided with an aperture 90*a* as shown in FIG. 24, with the strips 90*b* and 90*c* forwardly and rearwardly of this aperture extending through a pair of notches in the lower edge of the substrate as shown in FIGS. 24 and 28. The upper, flat arm of the U-shaped heat sink extends half-way across the base and terminates in a pair of lugs 90*d* and 90*e* that fit into notches in the upper edge of substrate 92 to mount the substrate in a vertical position at the middle of the compartment within the base. This heat sink is positioned in the forward part of the compartment within the base and is further provided with an extension 90*f* extending rearwardly from the rear edge of the yoke portion thereof as shown in FIGS. 23 and 24 to abut the rear wall of the base.

Substrate 92 is provided with a trough 92*a* at its rear portion as shown in FIG. 24 for slidingly receiving a guiding lug 74*a* at the lower rear portion of the trigger as shown in FIG. 34. As shown in FIG. 28, the substrate is provided with a printed circuit having a number of sections PC1-5 making the connections shown schematically in FIG. 29. A first section PC1 connects the heat sink to the forward end of variable resistor R1. A wiper 104 is pivoted to the substrate by a rivet 104*a* or the like and is arranged to wipe along resistor R1 at one end as the other end is moved by depression of the trigger. This wiper contacts a collector ring around its pivot to connect to a second section PC2 of the printed circuit. This section PC2 is connected through a capacitor C1 and section PC3 to a terminal which is connected by a wire to terminal T1 of triac T. Section PC2 is also connected through resistor R2 and section PC4 to a terminal which is connected by a wire to diac D of solid state element SS. Section PC3 is connected through a capacitor C2 to section PC4. The heat sink is connected at lug 90*e* to section PC5 of the printed circuit.

This printed circuit section PC5 is connected to internal connector IC′. For this purpose, this internal connector is mounted at its reduced end, shown in FIG. 24, into slot 92*b*, shown in FIG. 28, in the substrate and is soldered thereat to printed circuit section PC5.

This printed circuit section PC5 is also connected to shunting contact 102. For this purpose, forwardly bent tab 102*a* of the shunting contact, shown in FIG. 24, is soldered against the downwardly extending portion of section PC5 with the shunting contact bearing against the rear edge of the substrate thereby to mount the shunting contact in the position shown in FIG. 30.

Movable contacts 94 and 96 are mounted on the substrate. For this purpose, movable contact 94 is provided with a pair of lateral tabs that extend into diagonal slots **92*c* of the substrate from the left side thereof, the upper tab being soldered to printed circuit section PC3. In a similar manner, movable contact 96 is provided with a pair of lateral tabs that extend into the other diagonal slots 92*d* of the substrate from the right side thereof whereas similar lateral tabs of connector 98 extend into these other diagonal slots 92*d* from the left side of the substrate. These pairs of tabs may be soldered together to connect movable contact 96 to connector 98** as shown schematically in FIG. 29.

As a result in the foregoing construction, the subassembly including the heat sink, substrate, movable contacts, shunting contact, and connectors appears as shown in top view in FIG. 23.

The switch is provided with an adjustable trigger stop mechanism to enable the operator to come back to, and lock the trigger at, any desired speed setting previously made. For this purpose, there is provided a slidable stop block 106 and a rotary adjusting button 108 mounted in the trigger as shown in FIGS. 20, 31 and 32.

Figure 32:
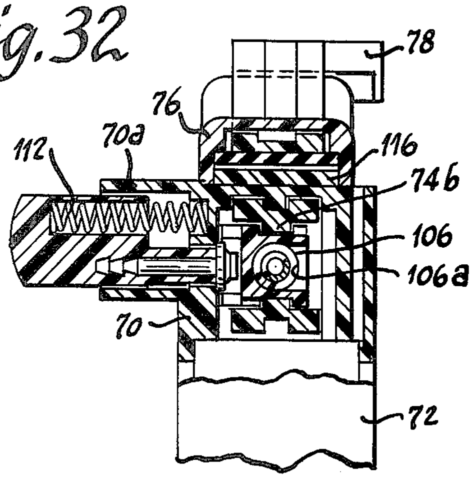
FIG. 32 is a vertical lateral cross-sectional view taken along line 32—32 of FIG. 31 to show the adjustable trigger stop mechanism from a different direction.

This stop block 106 is a generally rectangular block having upper and lower channels shown in FIG. 32 whereby it is slidably guided between upper and lower ridges **74*b* formed in an elongated aperture in the trigger. That is, this elongated aperture with its upper and lower ridges forms a slide for retaining the stop block and allowing forward-rearward movement thereof relative to the trigger when adjusting button 108** is turned. The upper channel on the stop block is provided by a left-forward lug and a right-rear lug as shown in FIG. 20. The lower channel on the stop block is provided by a left-forward lug and a right-rear lug as also shown in FIG. 20. This stop block is snapped in place within the trigger slide.

Figure 31:
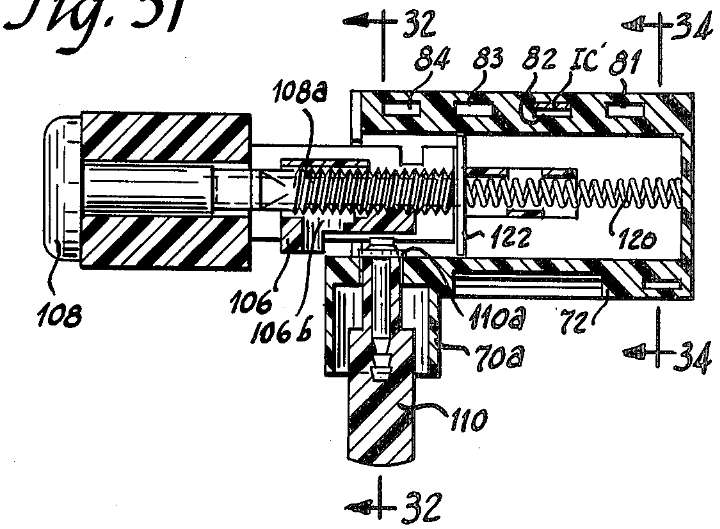
FIG. 31 is a horizontal cross-sectional view taken along line 31—31 of FIG. 20 to show the adjustable trigger stop mechanism.

For adjustment purposes, this stop block is provided with a round hole **106*a* therethrough with the left-rear portion of this hole having partial, 180°, half-threads engaged by threaded shaft 108*a*** of the adjusting button as shown in FIG. 31. The right hand portion of the stop block opposite these half-threads is open, thus allowing molding of this stop block and its half-threads in one piece.

Figure 20:
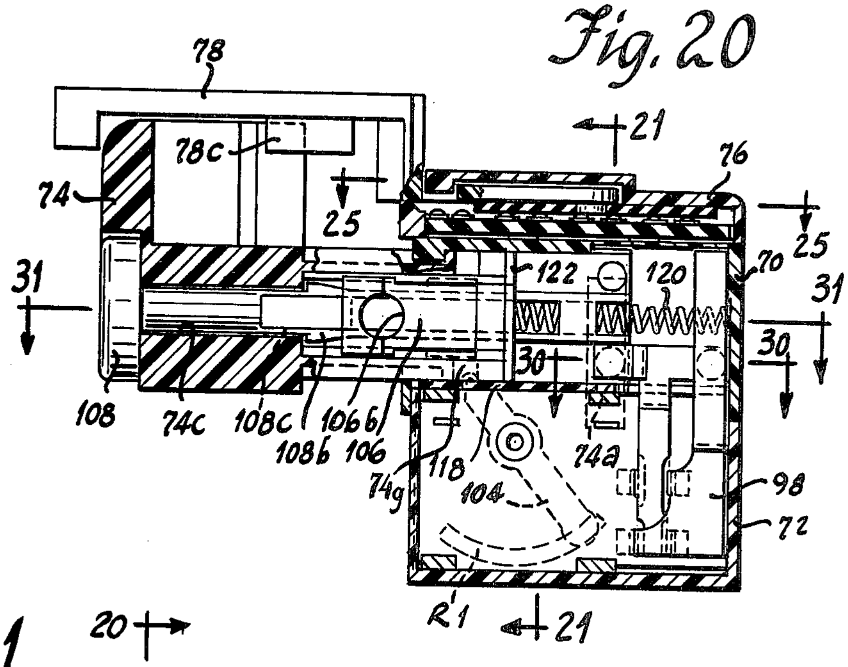
FIG. 20 is an enlarged vertical longitudinal cross-sectional view taken substantially along line 20—20 of FIG. 21 to show internal parts of a modified, modular, industrial reversing speed control trigger switch.

Rotary adjusting button 108 is provided with a pair of tapered teeth **108*b* shown in FIG. 20 whereby to provide a snap-in assembly of the button shaft into hole 74*c* in the trigger. This shaft is provided with a lateral slot 108*c* between these tapered teeth to allow inward flexure of the shaft enough to get it through the hole in the trigger. The remainder of the rear end of shaft 108*a* has a hole through to the end of its threaded part. The head of button 108** is sunk into the front end of the trigger as shown in FIG. 20 to provide a substantially flat surface for engagement by the forefinger of the user.

Stop block 106 is provided with a slot **106*b* on its left side as shown in FIGS. 20 and 31 to serve as a catch for a lock pin 110. This lock pin is mounted within a bushing 70*a* that extends laterally from the left-forward part of the frame. This lock pin is spring-biased outwardly and may be depressed by the thumb of the user to enter the slot in the stop block and catch on the undercut lip thereof by its annular flange 110*a* shown in FIG. 31. This lock pin may be constructed from two pieces as shown in FIG. 31, a molded button inserted into the bushing and a pin pressed from the inside of the frame into the hole in this button with a helical compression spring 112** in the bushing above the pin as shown in FIG. 32.

The reversing switch is shown in FIGS. 20 and 25. This reversing switch 76 is provided with a molded enclosure or housing having the aforementioned hooks **76*a* and 76*b* as shown in FIG. 21 and being open at the bottom. Operating lever 78 is first inserted up into this housing, this lever having a hole or recess 78*a* shown in FIG. 25 whereby it is pivoted onto a stud 76*c* molded integrally in the housing. Printed circuit (PC) board 114 is next inserted up into the housing so that stud 78*b* which is integral with the lower surface of the operating lever enters diagonal slot 114*a* in the PC board. Four bifurcated stationary contacts similar to those in the first version of FIG. 13 are then mounted on an insulator board 116 so that their terminals hang down therefrom. This subassembly of stationary contacts and insulator board is then inserted up for snug retention in the reversing switch housing as shown in FIG. 21. This reversing switch housing 76 is provided with suitable angular slots 76*d* in its right-hand side as shown in FIG. 21 to provide access for the terminals of the four stationary contacts. Hook 76*b* may consist of a plurality of narrow hooks between these slots 76*d*. When the reversing switch is snap-in mounted on the switch frame, these terminals extend down into slots 81–84 in the right wall of the frame as shown in FIGS. 21 and 31. Within slot 82, the terminal of contact 2 engages internal connector IC′ as shown in FIG. 21 and depicted schematically in FIG. 29. External wire connectors are pressed in from above into slots 81, 83 and 84 to connect the motor armature winding A across contacts 1 and 3 and to connect one side of the motor field winding F to contact 4 as schematically shown in FIG. 29. The other side of the motor field winding is connected via connectors 100 and 98 to movable on-off contact 96** as hereinbefore described.

PC board 114 carries the movable bridging contacts **114*b* and 114*c* of the reversing switch as shown in FIG. 25. Contact 114*b* is a generally inverted U-shaped printed circuit with the yoke portion thereof extending around the right-hand end of diagonal slot 114*a*. Contact 114*c*** is a generally rectangular printed circuit as shown in FIG. 25.

These movable bridging contacts are operated to connect alternative pairs of stationary contacts 1–4 when operating lever 78 is shifted. This operating lever is shown in its right-hand position in FIG. 25. In this position, stud **78*b* has acted on diagonal slot 114*a* to cam PC board 114 into its rear position. As a result, movable PC contact 114*c* bridges stationary contacts 1 and 2 and the forward end portion of movable PC contact 114*b* bridges stationary contacts 3 and 4 as shown in solid lines in FIG. 29. When the double pole on-off switch contacts are closed, current flows from line L1 through triac T, reversing switch contacts 1 and 2, armature A, reversing switch contacts 4 and 3** and field F to line L2. On each alternate half-cycle of the A.C. power source, the current flows in the opposite direction.

When operating lever 78 of the reversing switch is moved into its left-hand position, the direction of current in the armature is reversed to reverse the direction of motor rotation. For this purpose, the trigger is first released to return to its off position. Operating lever 78 has a lug 78c shown in FIG. 20 and trigger 74 has two spaced slots separated by a divider 74d shown in FIG. 22 that serve as an interlock to prevent actuation of the reversing switch when the trigger is depressed. Referring to FIG. 25, it will be seen that when the operating lever is shifted to its left-hand position, stud 78b thereof slides in diagonal slot 114a to cam PC board 114 to its forward position. As a result, movable PC contact 114b bridges stationary contacts 1 and 4 and movable PC contact 114c bridges stationary contacts 2 and 3, these stationary contacts being numbered 1–4 from the rear toward the front in accordance with slots 81–84 in FIG. 31, respectively. It will be seen by reference to FIG. 29 that this change in the reversing switch to the dotted line position has reversed the direction of current in the armature with resepct to the field to reverse the motor rotation.

Figure 33:
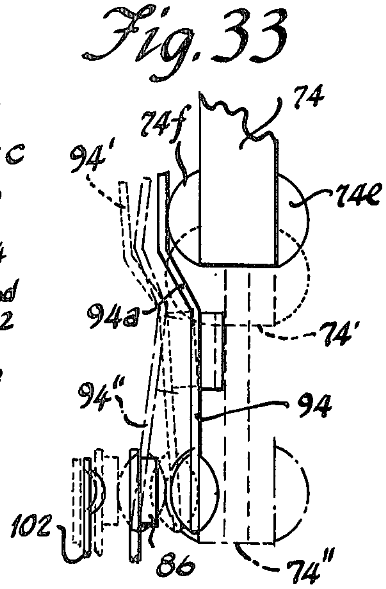
FIG. 33 is an enlarged fragmentary top view illustrating the left-hand movable contact action in responsive to trigger movement.

The double-pole on-off contacts close at the start of the trigger depression stroke followed by gradual decrease in variable resistor R1 and ending in closure of the shunting contact. For this purpose, the trigger is provided at its lower rear end portion with a pair of bosses 74e and 74f on the right and left sides thereof, respectively, as shown in FIGS. 30 and 33. As the trigger is depressed to dotted line position 74' in FIG. 33, these bosses enter between the flared, forward portions of movable contacts 94 and 96 and engage diverging parts 94a and 96a to spread them apart. This causes the movable contacts to assume the positions indicated by dotted line contact position 94' in FIG. 33. In this position, movable contact 94 engages stationary contact 86 with abutting and wiping action to close one pole of the on-off switch. In a similar manner, movable contact 96 engages stationary contact 88 with abutting and wiping action to close the other pole of the switch. As a result, A.C. power is applied across triac T and the portable tool motor. Current flows to charge capacitors C1 and C2 thereby to trigger diac D on each half-cycle of the A.C. wave and fire the triac into conduction. This starts the motor running at a slow speed.

As the trigger is depressed further, the double-pole on-off switch contacts remain closed and resistor R1 is operated to increase the motor speed. As shown in FIG. 20, the upper, laterally-bent end of wiper 104 extends into a notch 74g in the lower portion of the trigger. Insulating plate 118 which covers the open-top base has an elongated slot providing clearance for swinging movement of and guiding the upper end of wiper 104. As this trigger is depressed, helical return spring 120 compresses. The rear end of this spring abuts the rear wall of frame 70. The front end of this spring abuts and is held in a shallow recess in an insulating barrier plate 122. This barrier plate 122 is mounted on the trigger at the rear end of the stop block guide therein and serves as a dust barrier to prevent dust that might come in around the trigger from readily entering the contact area.

As this trigger is depressed further as aforesaid, wiper 104 pivots counterclockwise as seen in FIG. 28 to reduce the resistance in circuit. This causes the capacitors to charge to the diac triggering value sooner on each half-cycle thereby to advance the triac firing angle and increase the motor speed.

At the end of the trigger depression stroke, the shunting contact is closed to by-pass the speed control circuit and place the motor directly across the power supply for full motor speed. This occurs as depicted by dotted line contacts in FIG. 33. As the trigger is depressed to the end of its stroke at trigger position 74'' in FIG. 33, boss 74f engages the semispherical bump on the end of contact 94 thereby to move this contact 94 still further to the left. Contact 94 slides on and moves contact 86 whereby the latter slides on and engages shunting contact 102 thereby connecting contacts 94, 86 and 102 together with wiping action to keep the contacts clean. As shown in FIG. 29, this causes power line L1 to be connected directly to reversing switch 76 by-passing the speed control circuit including triac T. As a result, full supply voltage is applied to the motor for full speed operation.

While the apparatus hereinbefore described in effectively adapted to fulfill the objects stated, it is to be understood that the invention is not intended to be confined to the particular preferred embodiments of industrial reversing speed control trigger switches having snap-in modules disclosed, inasmuch as they are susceptible of various modifications without departing from the scope of the following claims.

I claim:

1. An industrial reversing speed control trigger switch of modular construction comprising:
- a frame having a trigger aperture therein;
- an insulating base including on-off switch contacts and a speed control circuit and means mounting said speed control circuit in said base;
- first snap-in means coupling said base to said frame;
- a spring-return trigger slidably mounted within said frame on top of said base and extending out through said aperture and comprising means for actuating said on-off switch contacts and means for operating said speed control circuit when said trigger is depressed;
- a reversing switch comprising an enclosure and reversing switch movable and stationary contacts housed therein and an operating lever;
- second snap-in means coupling said reversing switch enclosure to said frame;
- means in said base for making connections between said on-off switch contacts and an external circuit;
- means in said enclosure for making connections between said reversing switch contacts and the external circuit;
- and internal connector means connecting a reversing switch stationary contact to said speed control circuit.

2. The switch defined in claim 1, wherein said on-off switch contacts comprise:
- double-pole stationary contacts within said base;
- and a pair of movable contacts operable by said trigger for movement to engage the stationary contacts of the respective poles thereof.

3. The switch defined in claim 1, wherein said means for actuating said on-off switch contacts comprises:
- a spring-biased reciprocal member mounted in said base;
- and a cam on said trigger operable to move said reciprocal member to close said on-off switch contacts when said trigger is depressed an initial amount.

4. The switch defined in claim 1, wherein said means for actuating said on-off switch contacts and said means for operating said speed control circuit comprise:
- a spring-biased reciprocal-member mounted in said base and extending thereabove into said frame;
- means on said trigger operable upon depression thereof to cam said reciprocal member down to close said on-off switch contacts and simultaneously to rotate said member;
and spring-biased means on said member rotatable therewith to operate said speed control circuit.

5. The switch defined in claim 4, wherein:
said speed control circuit comprises a resistor;
and said spring-biased means is a wiper for varying said resistor.

6. The switch defined in claim 1, wherein:
said means mounting said speed control circuit in said base comprises a substrate and a heat sink;
said speed control circuit comprises a printed circuit on said substrate and a solid state current control element on said heat sink electrically connected to said printed circuit and a variable resistor for controlling said current control element;
and said means for operating said speed control circuit comprises means responsive to trigger depression for varying said variable resistor.

7. The switch defined in claim 1, wherein:
said reversing switch enclosure comprises a molded, center-hinged one-piece enclosure adapted to be folded closed and secured shut following assembly of said reversing switch contacts and said operating lever thereon.

8. The switch defined in claim 7, wherein:
said reversing switch contacts comprise a plurality of spaced stationary contacts arranged in sequence;
a printed circuit board having a plurality of movable contacts operable to bridge selected pairs of said stationary contacts when said printed circuit board is slid from one position to another;
and motion translating means coupling said operating lever to said printed circuit board for reciprocal sliding movement thereof in response to reversing pivotal movement of said lever.

9. The switch defined in claim 1, wherein:
said trigger comprises a half-thread adjustable stop block and a rotary screw for moving said stop block;
and said frame comprises a spring-biased lock button operable to engage said stop block thereby to lock said trigger in a desired adjusted speed position.

10. The switch defined in claim 1, wherein:
said trigger is symmetrical on its internal end portion whereby it may be assembled into said frame in either of two 180° rotated positions so as to adapt the switch for use in different portable electric tools.

11. The switch defined in claim 1, wherein:
said means mounting said speed control circuit in said base comprises a substrate and a heat sink;
and said on-off switch contacts comprise a pair of stationary contacts mounted in said base and a pair of movable contacts mounted on said substrate and adapted to engage the respective stationary contacts for double-pole action;
and bosses on said trigger for spreading said movable contacts to engage the respective stationary contacts when said trigger is depressed.

12. The switch defined in claim 11, wherein:
said on-off switch contacts also comprise a shunting contact mounted on said substrate;
and means on one of said movable contacts operable when said trigger is depressed fully for moving the respective stationary contact into engagement with said shunting contact.

13. The switch defined in claim 11, wherein:
said speed control circuit comprises said internal connector means mounted on said substrate so as to extend up within said frame;
and said reversing switch contacts comprise a terminal extending down within said frame into engagement with said internal connector means whereby to connect said speed control circuit to said reversing switch when said base and said reversing switch enclosure are snap-in coupled to said frame.

14. The switch defined in claim 1 wherein:
said means mounting said speed control circuit in said base comprises a heat sink and a substrate;
said heat sink comprising a generally rectangular planar member formed into a substantial U-shape to hug the interior walls of said base;
notches on opposite edges of said substrate;
and lugs on opposite edge portions of said heat sink fitting into said notches to support said substrate on said heat sink and electrically connect said heat sink to the speed control circuit on said substrate.

* * * * *